(12) United States Patent
Finke-Anlauff

(10) Patent No.: US 6,801,796 B2
(45) Date of Patent: *Oct. 5, 2004

(54) SOFT KEYS FOR A MOBILE COMMUNICATIONS DEVICE HAVING MOVEABLE PANELS

(75) Inventor: Andrea Finke-Anlauff, Braunschweig (DE)

(73) Assignee: Nokia Mobile Phones Ltd., Espoo (FI)

( * ) Notice: Subject to any disclaimer, the term of this patent is extended or adjusted under 35 U.S.C. 154(b) by 19 days.

This patent is subject to a terminal disclaimer.

(21) Appl. No.: 10/285,947

(22) Filed: Nov. 1, 2002

(65) Prior Publication Data

US 2003/0087663 A1 May 8, 2003

Related U.S. Application Data

(63) Continuation-in-part of application No. 09/584,297, filed on May 31, 2000, now Pat. No. 6,580,932, which is a continuation-in-part of application No. 09/859,067, filed on May 16, 2001.

(51) Int. Cl.[7] ................................................. H04B 1/38
(52) U.S. Cl. .............. 455/575.3; 455/90.3; 379/433.11; 379/434
(58) Field of Search ................................ 455/90.1, 90.2, 455/90.3, 550.1, 556.1, 556.2, 557, 575.1, 575.3, 575.4, 347; 379/433.01, 433.06, 433.11, 433.12, 433.13, 434; D14/137, 138

(56) References Cited

U.S. PATENT DOCUMENTS

| | | | |
|---|---|---|---|
| 5,493,690 A | * 2/1996 | Shimazaki | 455/575.3 |
| 5,584,054 A | * 12/1996 | Tyneski et al. | 455/566 |
| 5,644,338 A | 7/1997 | Bowen | 345/168 |
| 5,715,524 A | 2/1998 | Jambhekar et al. | 455/90 |
| 5,884,185 A | * 3/1999 | Kim | 455/575.1 |
| 6,151,485 A | * 11/2000 | Crisp | 455/575.4 |
| 6,542,721 B2 | 4/2003 | Boesen | 455/90 |
| 6,580,932 B1 | * 6/2003 | Finke-Anlauff | 455/566 |
| 2002/0006815 A1 | 1/2002 | Finke-Anlauff | 455/575 |

FOREIGN PATENT DOCUMENTS

| | | |
|---|---|---|
| EP | 0 472 361 A2 | 2/1992 |
| EP | 0 933 908 A2 | 8/1999 |
| EP | 0 997 810 A2 | 5/2000 |
| EP | 1 161 062 | 12/2001 |
| FR | 2 775 857 | 9/1999 |
| WO | WO 98/19226 | 5/1998 |
| WO | WO 98/19434 | 5/1998 |

* cited by examiner

Primary Examiner—Quochien B. Vuong
(74) Attorney, Agent, or Firm—Perman & Green, LLP

(57) ABSTRACT

A mobile communication device is provided with a body having a screen, a first panel fixed to the screen, and a second panel which mounted on said body for pivotable motion relative to said first panel. The second panel is either open or closed depending on the selected function of the device. A sensor generates a signal indicating the position of the second panel. Soft keys are provided which have alternative functions depending on the position of the second panel.

9 Claims, 6 Drawing Sheets

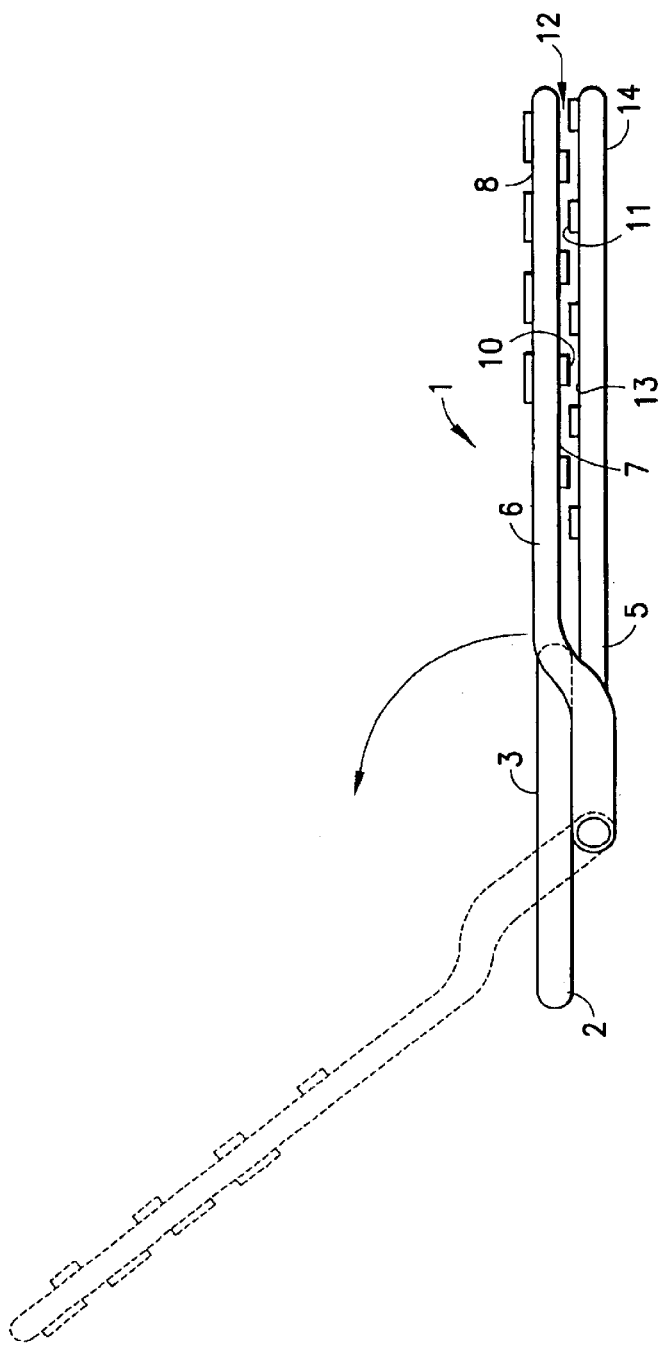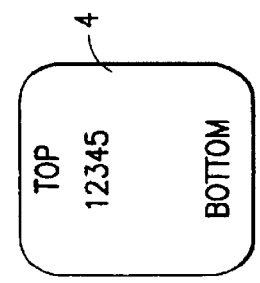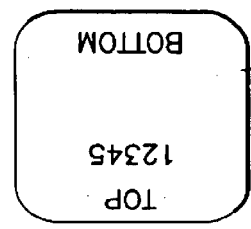

US 6,801,796 B2

SOFT KEYS FOR A MOBILE COMMUNICATIONS DEVICE HAVING MOVEABLE PANELS

CROSS REFERENCE TO RELATED APPLICATIONS

This application is a continuation-in-part of Application Ser. No. 09/584,297, filed on May 31, 2000 now U.S. Pat. No. 6,580,932 issued on Jun. 17, 2003. This application is also a continuation-in-part of Application Ser. No. 09/859,067, filed on May 16, 2001 which is a continuation-in-part application of Application Ser. No. 09/584,297.

BACKGROUND OF THE INVENTION

Mobile telephones and similar communication devices are rapidly expanding in use and function. Such devices will soon provide Internet access, personal information management, facsimile, messaging, in addition to telephone communication. To accomplish this there is a need to provide keyboards compatible with the more complex applications to which the mobile device will be adapted. Full function keyboards, such as the standard QWERTY typing array of keys and buttons, are difficult to provide while maintaining the compact size required in the mobile device. Such devices on the market today are cumbersome and often require a separate belt pouch for carrying the mobile device on the person of the user. In addition it is necessary to coordinate on screen displays for adaptation to the variety of functions.

It is a purpose of this invention to provide a simple and inexpensive means of providing a full function keyboard to accommodate the burgeoning applications to which a mobile communication device is adapted.

SUMMARY OF THE INVENTION

A mobile communication device is constructed having a body in which is mounted a viewing screen for displaying user interface communications. A first panel is fixed to the body and includes one half of a full function keyboard and a back cover. A second panel is pivotally mounted on the body for rotation between two positions, namely, a closed position and an open position. The second panel is constructed with inner and outer surfaces located on opposite sides of the panel which are positioned such that the inner surface faces the keyboard of the first panel and the outer surface is exposed in the closed position. In the open position, the second panel is pivoted approximately 180° so that the outer surface faces away from the user of the mobile device while the inner surface is exposed.

To enable the device to be operated as a communication device a communication keypad is constructed in the outer surface of the second panel. To provide the second half of the full function keyboard, the inner surface contains a keyboard which is operatively associated with the keyboard of the first panel in the open position. The screen remains exposed in each position of the second panel. The display which appears on the screen is oriented in a manner consistent with the position of panels.

In another embodiment of this invention, a switch is operatively associated with the moveable second panel to send a signal to the microprocessor controller of the device indicative of the position of the second panel. This information is used by the controller to adjust the function of keys to be consistent with the application for which the second panel is positioned. In particular an array of soft keys is mounted on the body of the display for convenient use. These soft keys have different functions depending on the position of the second panel.

In a preferred embodiment of this invention an array of three soft keys are positioned about the periphery of the user so that there are always two keys available at the bottom of the display and a third key available at the upper portion of the display. In this arrangement the key pattern is substantially the same irrespective of orientation of the device. The orientation will be horizontal or vertical depending on the position of the second panel. It is a purpose of this invention to provide substantially the same key functions for the key in a particular relative position in both modes of operation. The upper key, right or left, will be the power key and the lower right and left keys will each operate as a soft key to open quick selection profiles. Each key may be assigned a different menu for different key functions.

Considering first the use of the device with the second panel closed, for example as a mobile telephone, soft keys are arranged at the lower left, the lower right and the upper left of the display screen. In this position, the upper left hand key will operate as the power on/off key. The lower right and left keys operate as a soft key to open quick selection profiles and menus. For an example, one function of the lower keys that may be selected would be as up and down and left and right scroll keys. Other alternate functions may be devised depending on the applications served.

When the second panel is opened, the assigned function of the lower soft keys is shifted clockwise or counter clockwise by the controller depending on the use orientation of the device with the second panel open. The functions assigned to the newly positioned lower left and right keys will be the same as the keys positioned at these locations in the closed position. The upper key moves to the upper right and will be the power key. The device controller adjusts the assignment of key functions available at a soft key to provide a similar set of functions at substantially the same relative key location in the open position of the second panel, as in the closed position.

DESCRIPTION OF THE DRAWING

The invention is described in more detail below with reference to the attached drawing in which:

FIG. 3a is a side view of the communications device of this invention in the closed position;

FIG. 3b is a schematic illustration of the display orientation in the closed position;

FIG. 3c is a schematic illustration of the display orientation in the open position;

DESCRIPTION OF THE PREFERRED EMBODIMENT

Figure 1:
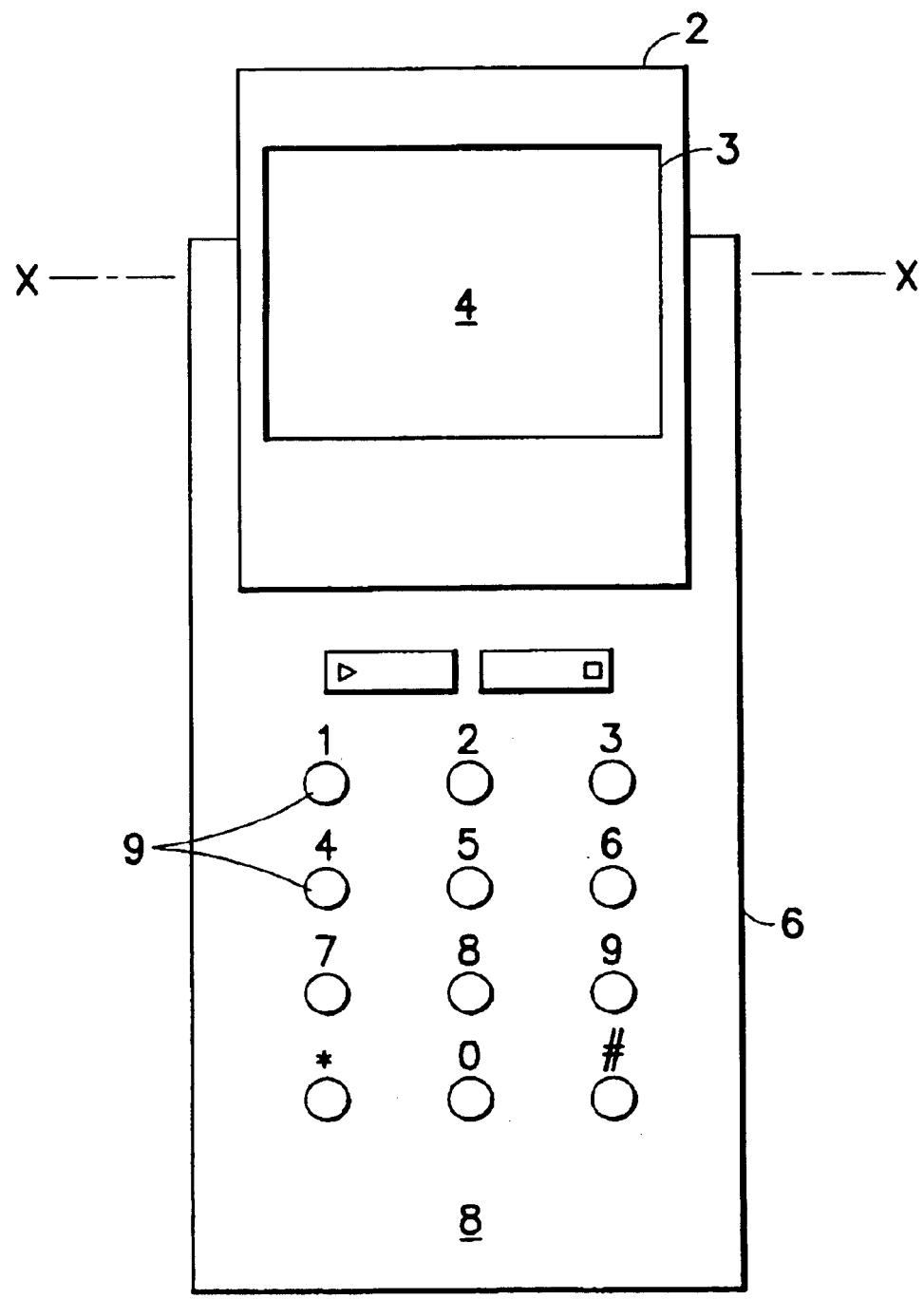
FIG. 1 is a top view of the communications device of this invention in the closed position.
Figure 2:
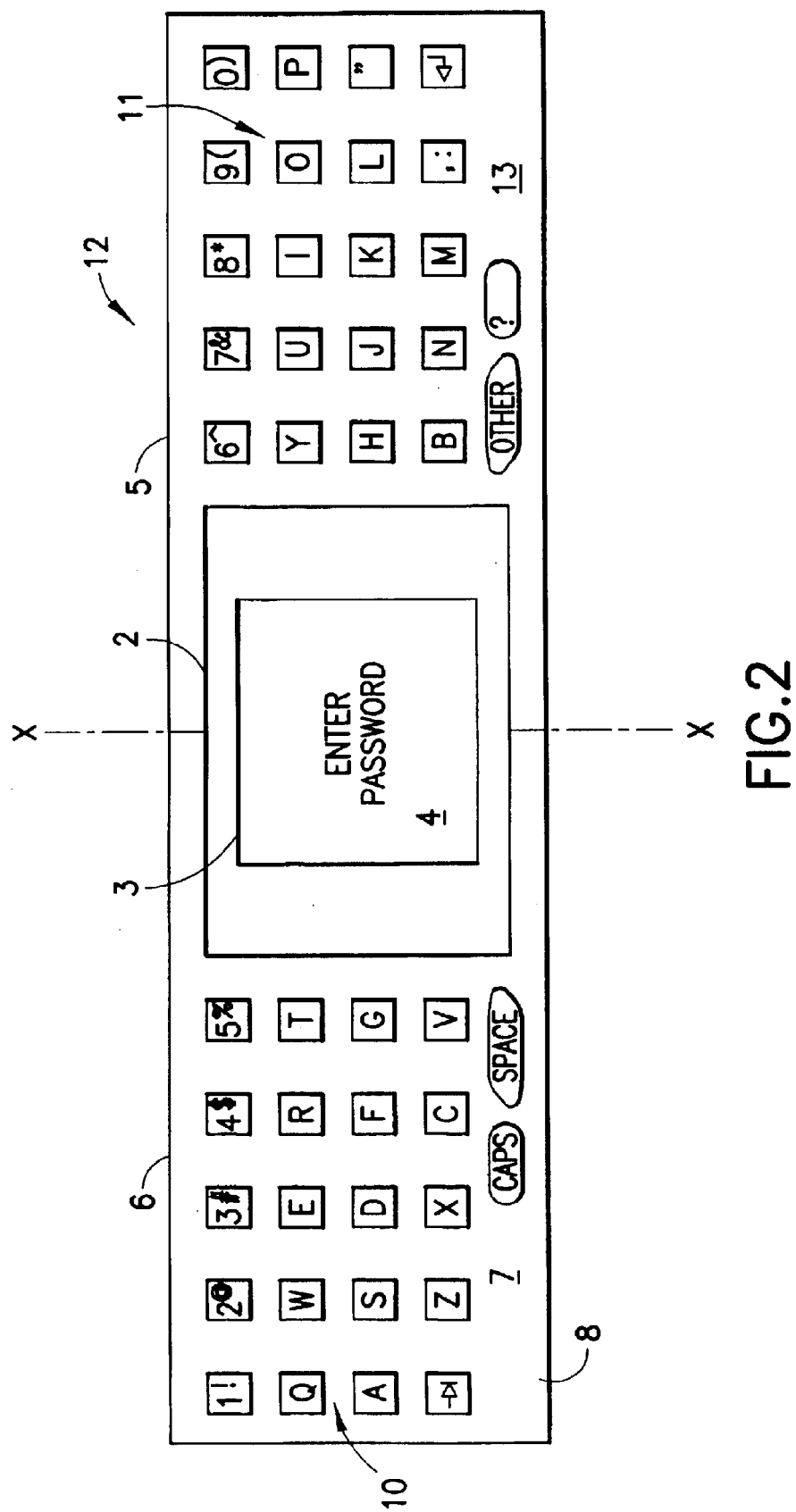
FIG. 2 is a top view of the communications device of this invention in the open position.
Figure 4:
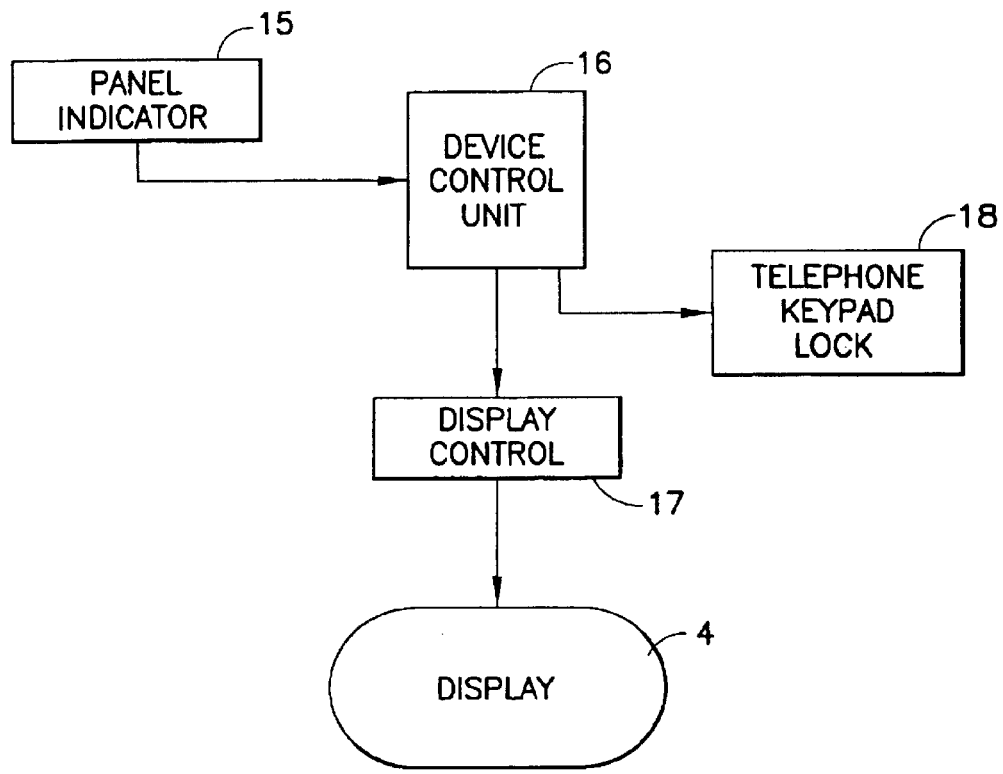
FIG. 4 is a block diagram of the control system of a communication device as it applies to this invention.

A mobile communication device is provided with a full function keyboard. For the purpose of illustration, this invention will be described with reference to a mobile telephone, but is applicable to other devices such as pagers, game units and the like. As shown in FIG. 3a, a mobile telephone 1 is constructed having a body 2. The body 2 encloses a screen 3 which provides a display 4 for communicating pertinent information to the user in response to actions by the user. The mobile telephone 1 is constructed having two panels 5 and 6 which are mounted on the body 2. In FIG. 3, panel 5 is shown fixed to body 2 as a separated component, but it could also be constructed integrally with body 2. Panel 6 is rotatable on the body 2 about an axis x—x as shown in FIGS. 1 and 2.

In a first position, referred to as the closed position, panel 6 is rotated into overlapping alignment with panel 5, as shown in FIG. 3a. Rotating panel 6 has two opposing flat faces 7 and 8. Face 7 is the inner face when panel 6 is in the closed position and face 8 is the outer face in the closed position. In the preferred embodiment, face 8 contains a standard telephone keypad 9 for use when the mobile phone 1 is operating strictly in the communication mode. In the closed position, the device operates as a standard operating mobile telephone with the display 4 of screen 3 oriented in alignment with keypad 9.

To provide the full function keyboard of the preferred embodiment of this invention, the key and button array 12, used for the particular application, is divided in half and arranged on left and right keyboard portions 10 and 11. To facilitate operation of the keyboard, it is designed for thumb actuation by both hands. This makes it convenient to hold the small device in both hands and operate the keyboard portions 10 and 11 accurately and efficiently.

As shown best in FIG. 3, the left hand keyboard portion 10 is constructed on face 7 of rotating panel 6 on the opposite side of telephone keypad 9. The right hand keyboard portion 11 is constructed on upper face 13 of panel 5. A back cover is assembled on the face 14 of panel 5. To insure a compact engagement of panels 5 and 6 in the closed position, the portions of key array 12 on the opposing panel faces 7 and 13 are offset to avoid interference in the closed position.

To operate the keyboard array 12, panel 6 is rotated approximately 180° to the open position to form a substantially flat unit having right and left keyboard portions separated by screen 3 as shown in FIG. 2. By holding the left and right hand portions in either hand, the keyboard, thus extended, can be conveniently operated using thumbs. In the open position, outer face 8 of panel 6 is oriented away from the user.

The display 4 of screen 3 is controlled for orientation in two positions depending on the mode of use. In the closed position, the display 4 is oriented in alignment with the keypad 9, while in the open position the display 4 is aligned with the function key array 12. As shown in FIGS. 3b and 3c, display orientation is rotated 90° between the mobile telephone mode in which panel 6 is in the closed position to the full function mode when panel 6 is in the open position. This is accomplished by providing a panel position indicator 15 which signals control unit 16 when the panel 6 is opened or closed. Control unit 16 may be a microprocessor, display driver or other means including hardware or software. This could be automatic or by a manual button operated by the user. The control unit 16 will signal the display control 17 to orient the position of the display as needed. In addition, in the open position, keypad 9 will be locked in an inoperative mode by telephone keypad lock 18.

Figure 5:
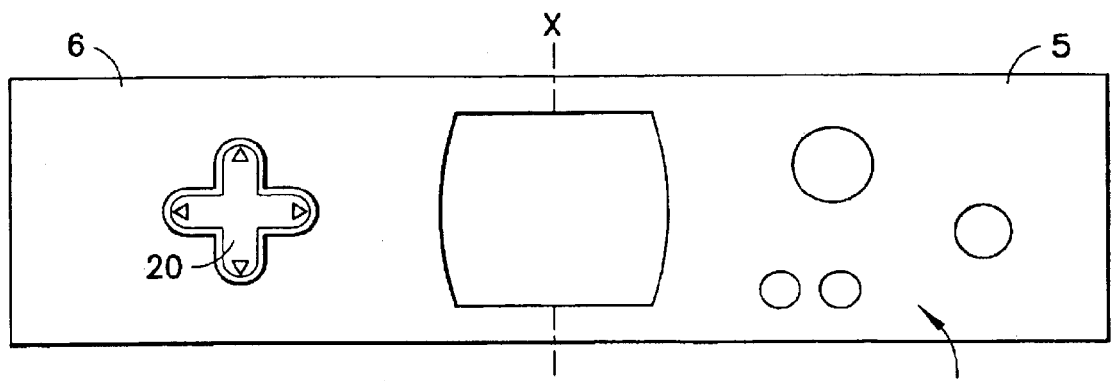
FIG. 5 is a top view of an alternative embodiment of this invention.

In the alternate embodiment shown in FIG. 5, instead of a keyboard, a game controller keypad is provided. The game keyboard consists of action buttons 19 and motion pad 20 constructed in panels 5 and 6 respectively. The telephone keypad 9 is constructed in the reverse side of panel 6, as described above. As a further alternative, the device could be designed without a communication capability and used as a game unit only.

In this manner, a simple and compact keyboard is provided in operative association with a mobile communications device. It should be noted that other key arrays can be used such as the French AZERTY or the German QWERTZ (U). The device would also be useful as a microprocessor based game unit driven by game software or firmware.

In another embodiment of this invention, the panel position indicator 15 may be used to provide additional flexibility in the functioning of the device. Panel indicator 15 can be a series of contacts which are engaged in one of the positions of panel two or a switch which is closed or opened in one of the positions. Whatever scheme of actuation is used, panel indicator 15 sends a signal to the device control unit 16 which indicates the position of the moveable panel 6.

Figure 6:
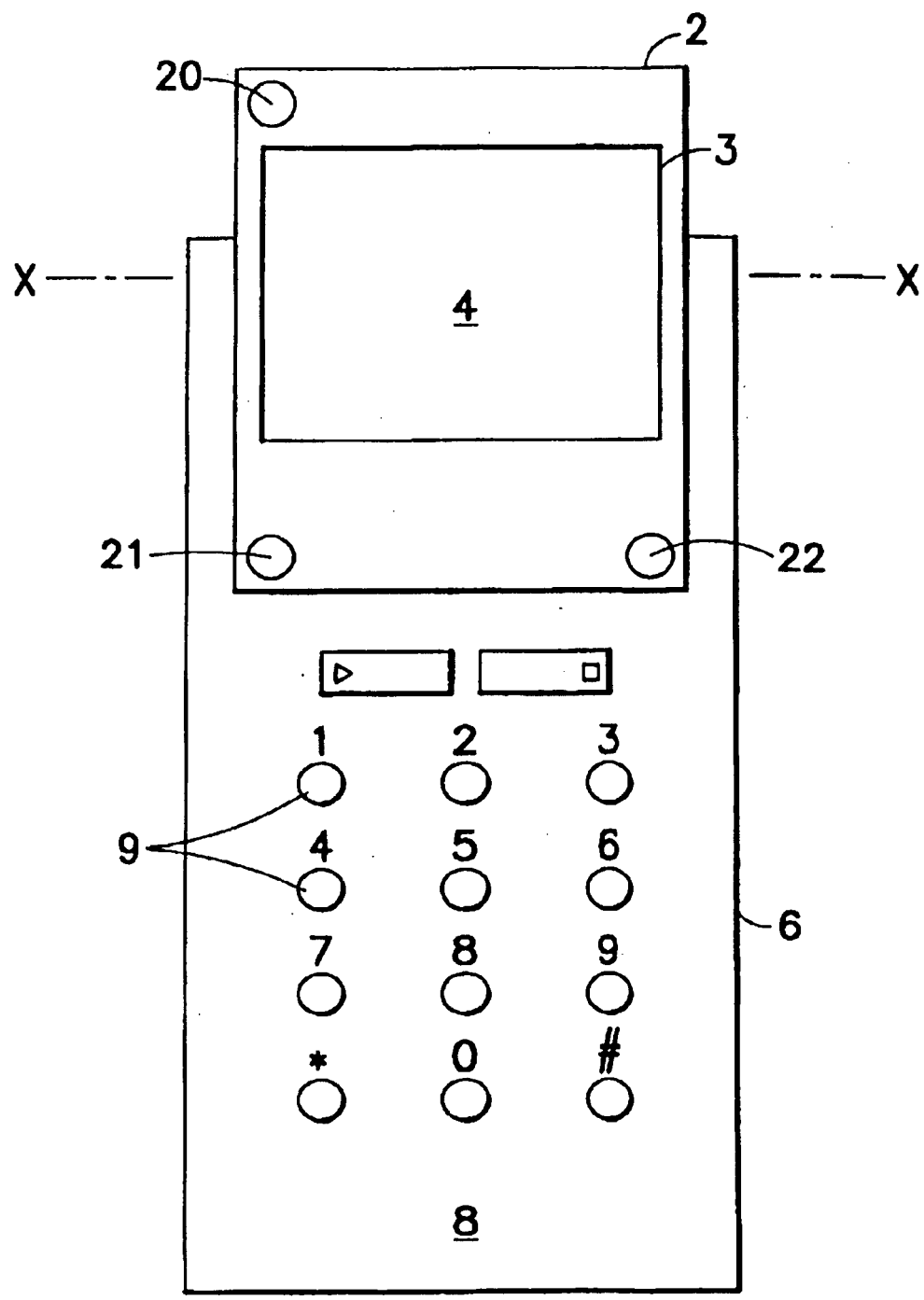
FIG. 6 is a top view of embodiment of this invention showing an array of soft keys with the second panel closed.
Figure 7:
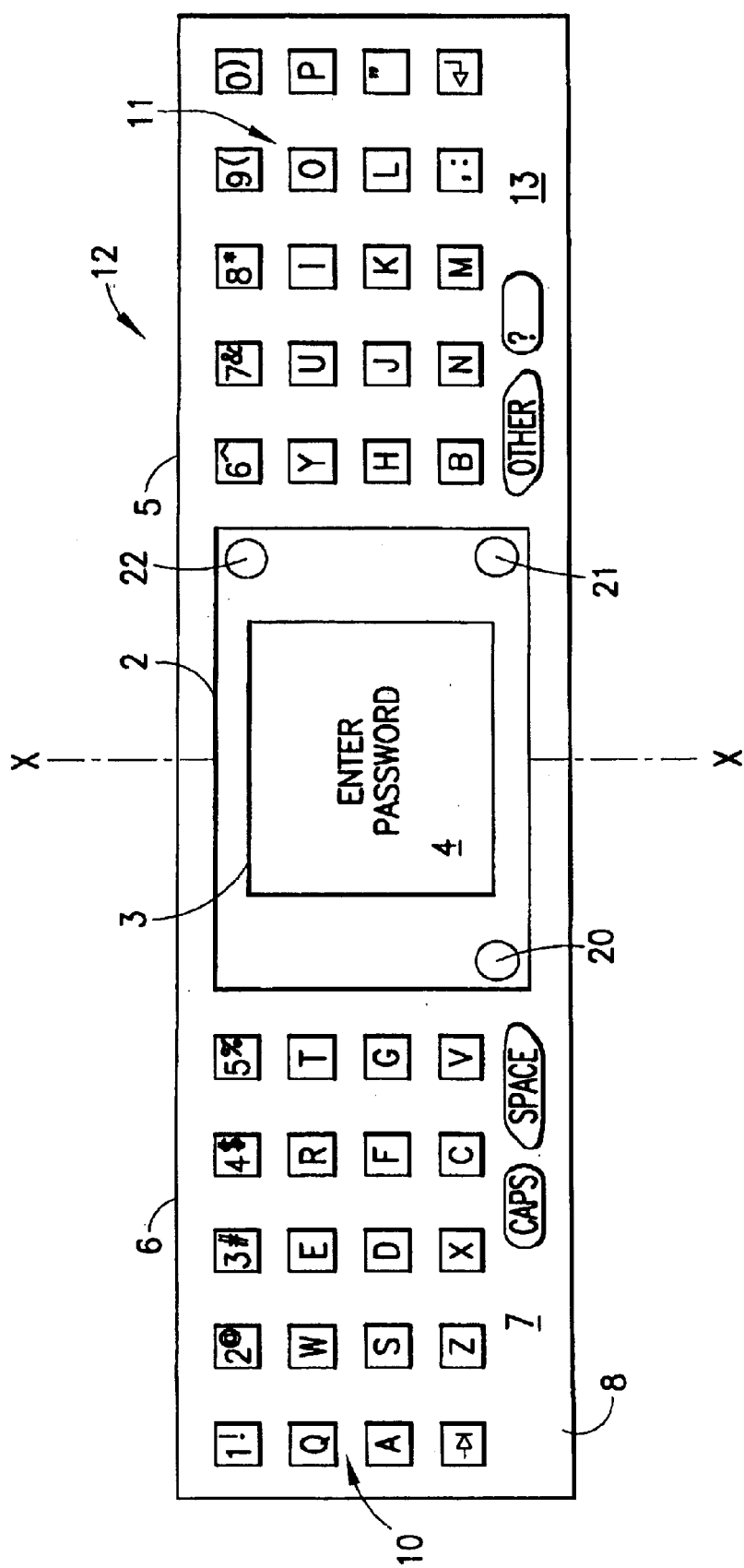
FIG. 7 is a top view of the embodiment of FIG. 6 with the second panel open.

As shown in FIGS. 6 and 7, soft keys 20–22 are constructed on body 2 at the periphery of the screen 3. These soft keys are alternatively assigned to provide different functions depending on the position of the second panel 6. The assignment of functions of the soft keys is controlled by device control unit 16 in response to signals from the panel position indicator 15.

In a preferred embodiment of this invention, as shown in FIGS. 6 and 7, an array of soft keys 20, 21, and 22 is provided in which soft key 20 is at the upper left of the screen 3, soft key 21 is at the lower left of screen 3, and soft key 22 is at the lower right of screen 3, when the panel 6 is in its closed position. In this position, which, as shown, is the position in which the device is used as a mobile phone, the use orientation is referred to as vertical. The functions that are assigned to the lower keys 21 and 22 are preferably for scrolling through profiles and menus to select specific sets of optional functions and services. A different set of key functions can be assigned to each of the lower keys. The power on/off function is assigned to upper key 20. The user of the device therefore, becomes familiar with the location of the functions in this position of use.

In the open position, the device control 16 reassigns the functions of the soft keys to shift the set of functions of the lower keys clockwise or counter clockwise while the function of the upper left key is shifted to the upper right. In the device shown, the functions of the lower keys are shifted clockwise when moving panel 6 from closed to open position. This makes it easier for the user to become familiar with the location of certain functions and sets of key functions in either operational mode of the device.

In the open position (horizontal position), the array of keys is physically shifted clockwise and the upper soft key (key 20 in the vertical position) becomes key 22 at the upper right, while the lower soft keys (key 21 and 22 in the vertical position) are now keys 20 and 21. Soft key 20 therefore is reassigned the functions of the lower left key and soft key 21 is reassigned the functions of the lower right key. The power on/off function is reassigned to key 22.

The alternative functions in closed and open positions of panel 6 may be assigned in a wide variety of combinations and permutations depending on the applications served. The above examples generate considerable convenience in a dual mode device, but are not intended by any means to be exhaustive of the combinations that may be provided.

I claim:

1. An electronic device for operation in multiple applications comprising:
   a body element having upper and lower faces relative to usage:
      a screen constructed in the upper face of said body element to provide a visible display of information to the user;
      a first panel fixed to said body element;
      a second panel mounted on the body element for motion thereon between open and closed positions, said second panel having first and second faces;
      said first face accessible to the user in said closed position and said second face accessible to the user in said open position;
      a sensor for sensing the position of said second panel and generating a signal indicative thereof;
      at least one soft key mounted on the device said soft key providing alternative functions depending on the position of said second panel.

2. An electronic device for operation in multiple applications, as described in claim 1, further comprising a control unit for controlling the function of the device wherein said control unit operates to receive the signal from said sensor and to adjust the function of the at least one soft key between its function in the closed position of said second panel and said alternative function according to the position of said second panel indicated by said signal.

3. An electronic device for operation in multiple applications, according to claim 1 wherein said at least one soft key comprises:
   an array of soft keys, each of said keys assigned at least one function of a set of key functions; and
   wherein said at least one function is reassigned to a different soft key in said array upon the movement of said second panel from one position to the other.

4. An electronic device for operation in multiple applications, according to claim 3, wherein said array is comprised of three soft keys positioned about the periphery of said screen and said set of functions is divided among said keys, said set of key functions comprising:
   a first key function for accessing a first menu and scrolling through said first menu, said first menu having a first set of options;
   a second key function for accessing a second menu and scrolling through said second menu, said second menu having a second set of options; and
   a third key function for operating a power on/off switch.

5. An electronic device for operation in multiple applications, according to claim 4, wherein said function keys for said first and second menus are positioned below the screen and said function key for said on/off operation is located adjacent an upper periphery of the screen.

6. An electronic device for operation in multiple applications, as described in claim 5, further comprising a control unit for controlling the function of the device wherein said control unit operates to receive the signal from said sensor and to reassign said key functions of said set to maintain the relative position of said key functions.

7. An electronic device for operation in multiple applications comprising:
   a body element having upper and lower faces relative to usage:
      a screen constructed in the upper face of said body element to provide a visible display of information to the user;
      a first panel fixed to said body element;
      a second panel mounted on the body element for motion thereon between open and closed positions, said second panel having first and second faces; said first face accessible to the user in said closed position and said second face accessible to the user in said open position;
      a sensor for sensing the position of said second panel and generating a signal indicative thereof;
      an array of soft keys, each of said keys assigned at least one function of a set of key functions, wherein said at least one assigned function is reassigned to a different soft key in said array upon the movement of said second panel from one position to the other;
      a control unit for controlling the function of the device wherein said control unit operates to receive the signal from said sensor and to reassign said key functions of said set to maintain the relative position of said key functions to said screen in either of said positions of the second panel.

8. An electronic device for operation in multiple applications, according to claim 7, wherein said array is comprised of three soft keys positioned about the periphery of said screen and said set of functions is divided among said keys, said set of key functions comprising:
   a first key function for accessing a first menu and scrolling through said first menu, said first menu having a first set of options;
   a second key function for accessing a second menu and scrolling through said second menu, said second menu having a second set of options; and
   a third key function for operating a power on/off switch.

9. An electronic device for operation in multiple applications, according to claim 8, wherein said function keys for said first and second menus are positioned below the screen and said function key for said on/off operation is located adjacent an upper periphery of the screen.

* * * * *